United States Patent [19]
van Aalst

[11] Patent Number: 5,372,246
[45] Date of Patent: Dec. 13, 1994

[54] CONVEYOR BELT FOR CUTTING MACHINES

[75] Inventor: Jacobus van Aalst, Oostzaan, Netherlands

[73] Assignee: Machinefabriek Meyn B.V., Oostzaan, Netherlands

[21] Appl. No.: 99,996

[22] Filed: Jul. 29, 1993

[30] Foreign Application Priority Data

Aug. 4, 1992 [NL] Netherlands ............. 9201402

[51] Int. Cl.⁵ ............................. B65G 17/46
[52] U.S. Cl. ............................. 198/692; 198/844.1
[58] Field of Search .................. 198/688.1, 692, 844.1

[56] References Cited

U.S. PATENT DOCUMENTS

| 865,446 | 9/1907 | Stewart et al. | 178/692 X |
|---|---|---|---|
| 926,806 | 7/1909 | English | 198/692 |
| 1,405,571 | 2/1922 | Davis | 198/692 |
| 1,511,060 | 10/1924 | Miller | |
| 1,779,720 | 10/1930 | Wood | 198/692 |
| 2,685,360 | 8/1954 | Kaplan | 198/692 X |
| 3,321,066 | 5/1967 | Christianson | 198/692 |
| 4,112,797 | 9/1978 | Pearl | |
| 4,538,949 | 9/1985 | Liet et al. | 198/692 X |

FOREIGN PATENT DOCUMENTS

| 0220415 | 4/1988 | European Pat. Off. |
| 1301344 | 4/1902 | France |
| 842422 | 7/1960 | United Kingdom |
| 1331026 | 9/1973 | United Kingdom |

OTHER PUBLICATIONS

Foreign Search Report with Translation.
HEMCO Brochure, Oct. 1984.

*Primary Examiner*—D. Glenn Dayolan
*Attorney, Agent, or Firm*—Dority & Manning

[57] ABSTRACT

According to the invention, a conveyor belt, especially fit for application in a water jet cutter, consists of a number of distanced strip-shaped members extending transversally to the conveyor belt. The edge of the strip-shaped member defining the transporting surface of the conveyor belt is provided with a serrated profile. Thus, rebounding of a waterjet is effectively prevented.

9 Claims, 1 Drawing Sheet

CONVEYOR BELT FOR CUTTING MACHINES

BACKGROUND OF THE INVENTION

The present invention relates to a conveyor belt, especially for application in a waterjet cutter.

Cutting products, for example flatfish, using a waterjet cutter is gaining popularity more and more. In a known waterjet cutter the product to be cut is supported by a conveyor belt. Generally the conveyor belt is of a conventional construction.

Disadvantageous of such a known conveyor belt is that the water ejected by the waterjet cutter cannot be discharged quickly enough and rebounds from the transporting surface of the conveyor belt. As a result the product supported by the conveyor belt is lifted from the surface of the belt and may shift. Further, it appears that the waterjet rebounding from the conveyor belt creates a counter pressure at the lower side of the product counteracting the process of passing the product by the cutting waterjet. The obtained cutting result is negatively influenced by these effects.

OBJECTS AND SUMMARY OF THE INVENTION

It is an object of the invention to provide a conveyor belt of the present type obviating the disadvantage discussed in a simple, but nevertheless effective way. Additional objects and advantages of the invention will be set forth, or may be learned, from the following description.

Thus, according to the invention, the conveyor belt is characterized in that it consists of longitudinally distanced, transversally extending strip-shaped members of which the principal plane is directed perpendicularly to the conveyor belt and of which the edge defining the transporting surface of the conveyor belt as a serrated profile.

As seen perpendicularly to the transporting surface of the conveyor belt the strip-shaped members have a minor surface, such that the amount of rebounded water is dramatically reduced. Further, because the respective edge of the strips has a serrated profile, water hitting the edge will not be rebounded in a straight line but inclined such that the rebound of water towards the product will be prevented. Finally, because the strip-shaped members are somewhat distanced, a quick discharge of the water in between these strip-shaped members is possible.

It is noted that GB-A-842.422 shows a conveyor belt comprising members having in essence a serrated profile, the upper edges of these members however are rounded-off.

In a preferred embodiment of the conveyor belt according to the invention the serrated profile comprises isosceles teeth. Strip-shaped members shaped like this can be manufactured quickly, simply, and cheaply using conventional manufacturing techniques.

Further, it is advantageous if the edge of the strips is bevelled at the bottoms of the serrated profile. Thus, it can be effectively prevented that a waterjet, which hits the edge of a strip-shaped member exactly at such a bottom, rebounds straight back and lifts the product to be cut from the conveyor belt.

In correspondence with an alternative embodiment of the conveyor belt according to the invention, it is possible that the serrated profile comprises inclined teeth, such that a tooth point, as seen perpendicularly to the transporting surface of the conveyor belt, covers an adjoining tooth bottom. Using such a shape of the teeth, it can be prevented that a waterjet can directly hit a tooth bottom, such that it is not necessary to bevel the serrated profile at that location.

Constructively it is preferred that the stripes are connected with their ends to endless chains. In this aspect the ends of the strips can be connected to the links of the chains using conventional techniques.

Hereinafter the invention will be elucidated referring to the drawing, in which a number of embodiments of the conveyor belt according to the invention are illustrated.

Figure 1:
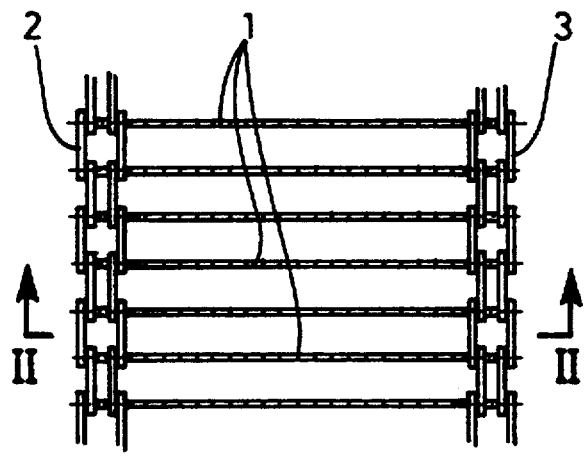
FIG. 1 shows in a top plan view a first embodiment of the conveyor belt according to the invention.

The conveyor belt according to the invention consists of slightly distanced strip-shaped members 1, the ends of which are connected to endless chains 2 and 3.

DESCRIPTION OF THE PREFERRED EMBODIMENTS

Reference will now be made in detail to the presently preferred embodiments of the invention, one or more examples of which are illustrated in the drawings. Features illustrated or described as part of one embodiment can be used on another embodiment to yield a still further embodiment. The numbering of components is consistent throughout the application, with the same components having the same number in each of the drawings.

As seen in FIG. 1, the strip-shaped members 1 of the belt according to the invention extend transversally across the conveyor belt, whereas their principal plane is directed perpendicularly to said conveyor belt.

Figure 2:
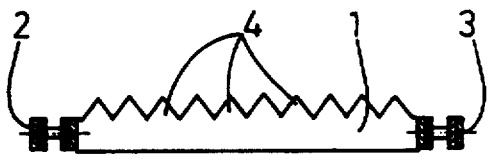
FIG. 2 shows a section according to line II—II in FIG. 1.

As appears clearly from FIG. 2 the edge of each strip-shaped member 1, which together with the edges of other strip-shaped members defines the transporting surface of the conveyor belt onto which the products to be cut are to be supported, has a serrated profile. In a preferred embodiment illustrated in FIG. 2, the serrated profile comprises isosceles teeth 4, but are not limited to this profile.

Figure 3:
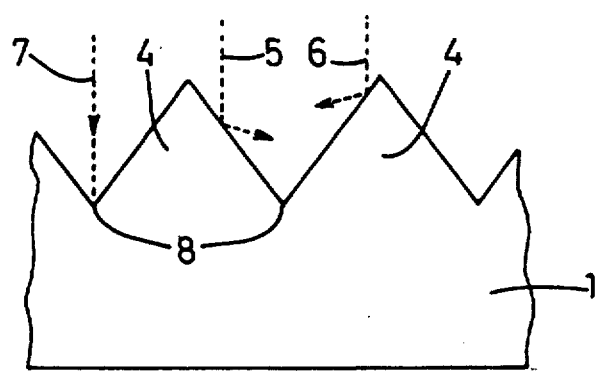
FIG. 3 shows, on a larger scale, part of the conveyor belt shown in FIG. 2.

In FIG. 3, part of a strip-shaped member 1 having isosceles teeth 4 is illustrated on a larger scale. From this FIG. 3, the advantage of the serrated profile clearly appears. A waterjet hitting the serrated profile generally will not rebound straight back, but will (dependant upon the slope of the teeth 4) rebound in a more or less inclined manner (in FIG. 3 this concept is schematically indicated by the dotted arrows 5 and 6). With this configuration, it can be prevented that products supported by the conveyor belt are lifted and shifted by rebounded waterjets while cutting.

Figure 4:
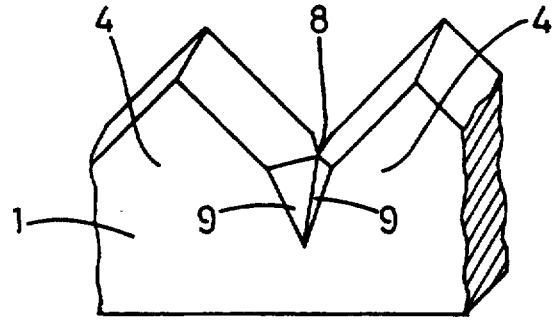
FIG. 4 shows in a perspective view part of a second embodiment of the conveyor belt according to the invention.

Theoretically there is a chance that a waterjet, which in correspondence with dotted arrow 7 in FIG. 3 exactly hits a tooth bottom 8 between two adjoining teeth 4 and is rebounded straight back. In order to avoid this, in an alternative embodiment of the strip-shaped members, a bevelling of the serrated profile is provided at the location of such a tooth bottom 8, in correspondence with FIG. 4. In the embodiment illustrated, such a bevelling comprises four planes 9 joining each other in the center of the tooth bottom 8 and positioned in pairs at both sides of the strip-shaped member 1 (in FIG. 4 only two planes are visible). Now, a waterjet will always hit an inclined plane, also at a tooth bottom 8, such that rebounding a waterjet straight back is at all times effectively avoided.

Figure 5:
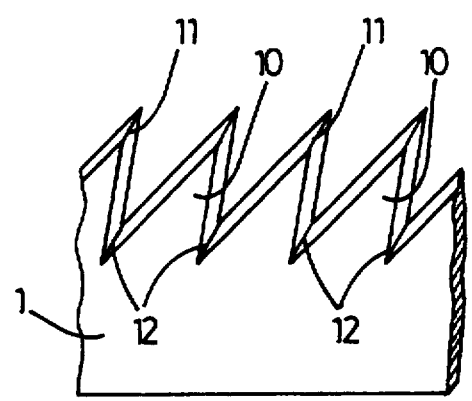
FIG. 5 shows in perspective view part of a third embodiment of the conveyor belt according to the invention.

In FIG. 5, and embodiment of a strip member 2 is illustrated in which the teeth 10 are shaped with an inclination such that the teeth points 11, as seen perpendicularly to the transporting surface of the conveyor belt, always cover an adjoining tooth bottom 12. In this way, it may also be prevented that a waterjet rebounds straight back, because it cannot directly reach a tooth bottom 12.

The conveyor belt according to the invention is extremely fit for application in a waterjet cutter. However, its application is not limited thereto.

The invention is not limited to the embodiments described before, which may be varied widely within the scope of the invention as defined by the claims. In fact, it will be apparent to those skilled in the art that various modifications and variations can be made in the invention without departing from the scope or spirit of the invention. Thus, it is intended that the present invention cover such modifications and variations.

I claim:

1. A conveyor belt for a food product cutting machine, particularly a waterjet cutting machine, said conveyor belt comprising a plurality of spaced apart strip members having a top surface, said strip members disposed transversely to said conveyor belt so that said top surfaces of said strip members define a conveying surface of said conveyor belt, each of said top surfaces being defined by essentially only non-horizontal planar sections, said conveying surface thereby defining essentially only non-horizontal surfaces so as to minimize vertical rebound of a waterjet off of said conveying surface.

2. The conveyor belt as in claim 1, wherein said non-horizontal planar sections comprise a serrated profile.

3. The conveyor belt as in claim 2, wherein said serrated profile is defined by isosceles teeth.

4. The conveyor belt as in claim 1, wherein said strip members comprise relatively thin members and are oriented so that their longitudinal plane is perpendicular to said conveying surface.

5. The conveyor belt as in claim 4, wherein said top surface of said strip members comprise an edge of said strip members, said edge having a serrated profile.

6. The conveyor belt as in claim 1, wherein said non-horizontal planar sections comprise an alternating pattern of top and bottom points.

7. The conveyor belt as in claim 1, wherein said strip members are connected at their ends to endless chain members.

8. A conveyor belt for a food product cutting machine, particularly a waterjet cutting machine, said conveyor belt comprising a plurality of spaced apart strip members having a top surface, said strip members disposed transversely to said conveyor belt so that said top surfaces of said strip members define a conveying surface of said conveyor belt, each of said top surfaces being defined by essentially non-horizontal planar sections so as to minimize vertical rebound of a waterjet off of said top surfaces, said non-horizontal planar sections comprising an alternating pattern of top and bottom points, said bottom points further comprising bevelled surfaces.

9. A conveyor belt for a food product cutting machine, particularly a waterjet cutting machine, said conveyor belt comprising a plurality of spaced apart strip members having a top surface, said strip members disposed transversely to said conveyor belt so that said top surfaces of said strip members define a conveying surface of said conveyor belt, each of said top surfaces being defined by essentially non-horizontal planar sections so as to minimize vertical rebound of a waterjet off of said top surfaces, said non-horizontal planar sections comprising an alternating pattern of top and bottom points, said top points being defined by inclined teeth, said teeth extending over adjacent said bottom points with respect to a vertical plane through said bottom points.

* * * * *